US012791711B2

(12) United States Patent
Yeh et al.

(10) Patent No.: US 12,791,711 B2
(45) Date of Patent: Nov. 10, 2026

(54) PERIODICAL CORRELATION DETECTION FOR BACKGROUND LIGHT SUPPRESSION IN DIRECT TIME-OF-FLIGHT SENSOR

(71) Applicant: TAIWAN SEMICONDUCTOR MANUFACTURING COMPANY LTD., Hsinchu (TW)

(72) Inventors: Shang-Fu Yeh, Hsin Chu City (TW); Chin Yin, Tainan City (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 1145 days.

(21) Appl. No.: 17/847,264

(22) Filed: Jun. 23, 2022

(65) Prior Publication Data

US 2023/0417908 A1 Dec. 28, 2023

(51) Int. Cl.

*G01S 17/00* (2020.01)
*G01S 7/48* (2006.01)
*G01S 7/4863* (2020.01)
*G01S 7/4865* (2020.01)
*G01S 17/10* (2020.01)

(52) U.S. Cl.

CPC ............ *G01S 17/10* (2013.01); *G01S 7/4863* (2013.01); *G01S 7/4865* (2013.01)

(58) Field of Classification Search

USPC ........................................................ 356/5.01
See application file for complete search history.

(56) References Cited

U.S. PATENT DOCUMENTS

2018/0058924 A1* 3/2018 Storm ........................ G01J 1/44
2018/0338127 A1* 11/2018 Wang ...................... H04N 25/78
(Continued)

FOREIGN PATENT DOCUMENTS

DE 112022004619 T5 * 7/2024 ........... G04F 10/005
WO WO-2021144340 A1 * 7/2021 ........... G01S 7/4865
WO WO-2023051971 A1 * 4/2023 ........... G04F 10/005

OTHER PUBLICATIONS

"A 256×128 3D-Stacked (45nm) SPAD FLASH LIDAR with 7-Level Coincidence Detection and Progressive Gating for 100m Range and 10klux Background Light", P Padmanabhan, C Zhang, M Cazzaniga, B Efe, AR Ximenes, MJ Lee, E Charbon, 2021 IEEE International Solid-State Circuits Conference (ISSCC) 64, 111-113.

*Primary Examiner* — James R Hulka
(74) *Attorney, Agent, or Firm* — WPAT LAW; Anthony King

(57) ABSTRACT

A system and a method for time-of-flight (ToF) sensing are provided. The system comprises a sensing module array comprising a plurality of sensing modules. Each of the sensing modules comprises: a plurality of single-photon avalanche diode (SPAD) cells, a periodical correlation detection (PCD) circuit and a time-to-digital converter (TDC). The plurality of SPAD cells is for receiving reflected light pulses. Each of the SPAD cells outputs a pixel event signal with logical high if the SPAD cell receives a reflected light pulse. One of the SPAD cells is a selected SPAD cell. The PCD circuit is configured to count the pixel event signals with logical high for each detection period. The TDC is valid if a count of the pixel event signals with logical high in one detection period reaches a predetermined threshold and if the selected SPAD cell receives a reflected light pulse in the detection period.

17 Claims, 9 Drawing Sheets

(56) References Cited

U.S. PATENT DOCUMENTS

| | | | | |
|---|---|---|---|---|
| 2019/0174120 | A1* | 6/2019 | Wang | G01S 7/4863 |
| 2020/0116838 | A1* | 4/2020 | Erdogan | G01S 7/4863 |
| 2020/0158836 | A1* | 5/2020 | Henderson | G01S 17/894 |
| 2020/0217965 | A1* | 7/2020 | Calder | G01S 7/4811 |
| 2020/0278429 | A1* | 9/2020 | Mandai | G01J 1/0228 |
| 2020/0284883 | A1* | 9/2020 | Ferreira | G01S 7/4815 |
| 2020/0341144 | A1* | 10/2020 | Pacala | G01S 17/894 |
| 2022/0043128 | A1* | 2/2022 | Pacala | G01S 17/89 |
| 2022/0043156 | A1* | 2/2022 | Pacala | G01S 7/4815 |
| 2022/0137192 | A1* | 5/2022 | Yin | G01S 7/4865<br>356/4.01 |
| 2023/0176223 | A1* | 6/2023 | Pacala | G01S 17/894<br>356/5.01 |
| 2024/0393746 | A1* | 11/2024 | Strassmann | G04F 10/005 |

* cited by examiner

PERIODICAL CORRELATION DETECTION FOR BACKGROUND LIGHT SUPPRESSION IN DIRECT TIME-OF-FLIGHT SENSOR

TECHNICAL FIELD

The present disclosure relates to a system and a method for time-of-flight (TOF) sensing, and more particularly, to a system comprises a single photon avalanche diode, periodical correlation detection and time-to-digital converter to suppress background light for direct time-of-flight sensing.

DISCUSSION OF THE BACKGROUND

Time-of-flight (ToF) sensor are used in a wide range of applications, such as automotive light detection and ranging (LiDAR), 3D vision, face recognition, and range-finding, to measure a distance from the ToF sensor to an object. ToF measurement of a ray of light generated by a mono-chromatic or wide-spectral light source can be used in applications, such as 3-D imaging. The measurement is based on a detection of a light from the source which is reflected by the target to a detector. To address range and depth resolution, direct time-of-flight (DToF) has emerged as a powerful technique to perform LiDAR. In direct time-of-flight, to measure the ToF, the time difference between a START pulse, synchronized with the light source, and a STOP signal generated by the detector is evaluated.

The "Discussion of the Background" section is provided for background information only. The statements in the "Discussion of the Background" section are not an admission that the subject matter disclosed herein constitutes prior art with respect to the present disclosure, and no part of the "Discussion of the Background" section may be used as an admission that any part of this application constitutes prior art with respect to the present disclosure.

BRIEF DESCRIPTION OF THE DRAWINGS

A more complete understanding of the present disclosure may be derived by referring to the detailed description and claims when considered in connection with the drawings, where like reference numbers refer to similar elements throughout the drawings, and:

DETAILED DESCRIPTION

Figure 1:
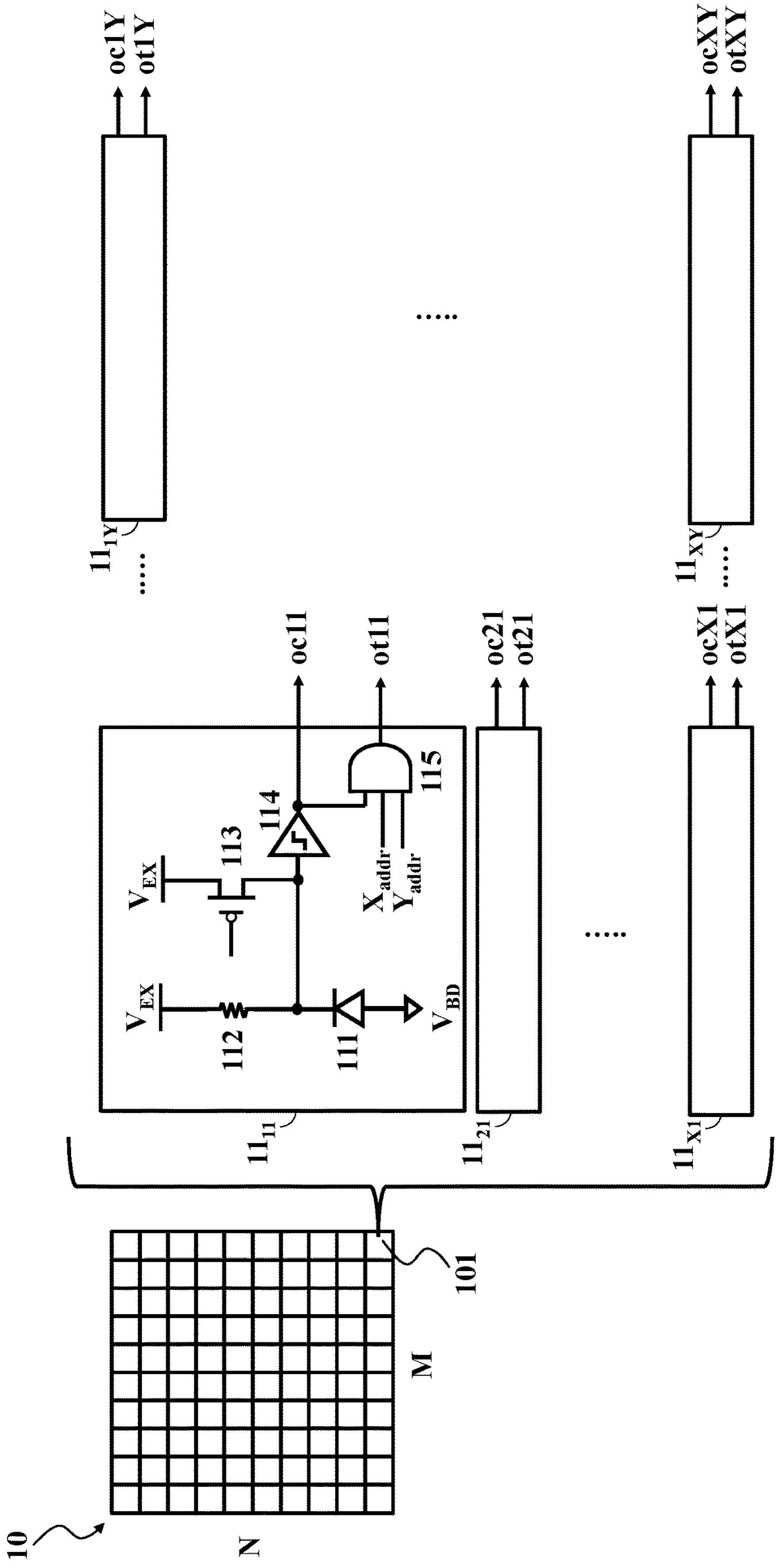
FIG. 1 is a schematic diagram of a system for time-of-flight sensing, in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that when an element is referred to as being "connected to" or "coupled to" another element, the initial element may be directly connected to, or coupled to, another element, or to other intervening elements.

It shall be understood that, although the terms first, second, third, etc., may be used herein to describe various elements, components, regions, layers or sections, these elements, components, regions, layers or sections are not limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

It should be noted that the term "about" modifying the quantity of an ingredient, component, or reactant of the present disclosure employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. In yet another aspect, the term "about" means within 10, 9, 8, 7, 6, 5, 4, 3, 2, or 1% of the reported numerical value.

The performance of DToF sensors based on DToF technique may be degraded in the presence of noise sources such as a dark-count rate (DCR) and a background illumination noise due to high-sensitivity of the DToF sensors to noise. For example, the thermally generated carriers associated with the dark count may trigger the DToF sensor generating a false photon count event, which may result in an inaccurate range measurement.

In order to detect light traveling time accurately, the background light noise from undesired light sources, such as sun or in-door light source, need to be minimized. A background light suppression method to improve signal-to-noise and background ratio (SNBR) can be accommodated by means of (1) optical filtering, (2) higher laser power, (3) time gating and (4) coincident detection. However, optical filtering is often restricted to a 10-to-50 nm bandwidth, which is insufficient for complete ambient light suppression. Due to eye safety and/or power constraints, high laser power is not always possible. Time gating is a powerful technique, but a rough target depth should be known in advance. Coincident detection can only detect coincident event from the surrounding pixels of a selected pixel after the selected pixel is triggered.

As demand for minimizing the background light noise and accurately detecting the light traveling time for a system for time-of-flight sensing, these has grown a need for a more advanced system capable of performing photon coincidence to suppress background light in detection.

FIG. 1 is a schematic diagram of a system for time-of-flight sensing, in accordance with some embodiments of the present disclosure.

FIG. 1 illustrates a system for time-of-flight (ToF) sensing. The system for ToF sensing comprises a sensing module array 10. The sensing module array 10 comprises a plurality of sensing modules 101. Each of the sensing modules 101 comprises a plurality of single-photon avalanche diode (SPAD) cells $\mathbf{11}_{11}$~$\mathbf{11}_{XY}$. The plurality of SPAD cells $\mathbf{11}_{11}$~$\mathbf{11}_{XY}$ is configured to receive reflected light pulses. Each of the SPAD cells $\mathbf{11}_{11}$~$\mathbf{11}_{XY}$ outputs a pixel event signals oc11~ocXY with logical high if the SPAD cell receives a reflected light pulse.

As illustrated in FIG. 1, each of the SPAD cells $\mathbf{11}_{11}$~$\mathbf{11}_{XY}$ includes a single-photon avalanche diode (SPAD) 111, a quench resistor 112, a recharge transistor 113, a comparator 114 and a decoder 115.

A single-photon avalanche diode (SPAD) is a solid state photodetector, in which, through an internal photoelectric effect, a photon-generated carrier can trigger a short duration but relatively large avalanche current. That is, when a photon is received, avalanche current indicating the detection is generated. This avalanche current is created through a mechanism called impact ionization, in which, electrons and/or holes, as carriers, are accelerated to high kinetic energies through a large potential gradient. If the kinetic energy of a received electron, or a hole, is large enough (as a function of the ionization energy of the bulk material), additional carriers (electrons and/or holes) are liberated from the atomic lattice. As a result, the number of carriers increases exponentially from as few as a single carrier to create the avalanche current. SPAD is capable of detecting different types of low-intensity ionizing radiation, including: gamma, X-ray, beta, and alpha-particle radiation along with electromagnetic signals in the UV, Visible and IR down to the single photon level. SPADs are also capable of distinguishing the arrival times of events (photons) at high accuracy with a timing jitter of only a few tens of picoseconds. The SPADs differ from avalanche photodiodes (APDs) in that SPADs are specifically designed to operate with a reverse-bias voltage far above the breakdown voltage. SPADs have recently been implemented in LIDAR, TOF 3D Imaging, PET scanning, single-photon experimentation, fluorescence lifetime microscopy and optical communications, particularly quantum key distribution. In some embodiments, the SPAD 111 can be fabricated in a silicon wafer or through a standard complementary metal-oxide-semiconductor (CMOS) manufacturing process. In some embodiments, the SPAD 111 can be fabricated using group III-V semiconducting materials.

In some embodiments, the anode of the SPAD 111 is connected to $V_{BD}$, where $V_{BD}$ is the SPAD breakdown voltage, so as to allow the SPAD 111 to operate under a pseudo-steady-state condition, in which no carriers exists in the depletion region of the SPAD 111. When a photon is received at the SPAD 111, carriers (e.g., an electron and a hole) can be generated and injected to the depletion region causing impact ionization and avalanche. The cathode of the SPAD 111 is connected to an excessive bias voltage $V_{EX}$ through the quench resistor 112. When reflected light is received on the SPAD 111 and avalanche effect is triggered, a large amount of pull-down current is produced, resulting in a less voltage difference between the anode and cathode of the SPAD 111 until the voltage difference is less than the SPAD breakdown voltage so that the current becomes zero. The recharge transistor 113 is then configured to recharge the voltage of the cathode of the SPAD 111 to the excessive bias voltage $V_{EX}$ in preparation for the next photon detecting event.

In some embodiments, the cathode of the SPAD 111 is coupled to a comparator 114. In some embodiments, the comparator 114 is configured to level-shift and reshapes the avalanche pulse into a logic-core voltage pulse. The comparator 114 outputs the pixel event signals oc11~ocXY.

In some embodiments, the plurality of SPAD cells $\mathbf{11}_{11}$~$\mathbf{11}_{XY}$ are arranged in x rows and y columns in each of the sensing modules 101. In some embodiments, the output terminal of the comparator 114 is further connected to one of the three input terminals of the decoder 115. The other two input terminals of the decode 115 are connected to the address selection signals $X_{addr}$ and $Y_{addr}$. In some embodiments, one of the SPAD cells $\mathbf{11}_{11}$~$\mathbf{11}_{XY}$ is a selected SPAD cell. Hence, for each sensing module 101, only the selected SPAD cell of SPAD cells $\mathbf{11}_{11}$~$\mathbf{11}_{XY}$ is provided with the address selection signals $X_{addr}$ and $Y_{addr}$ both as logical high.

In some embodiments, each of the plurality of the SPAD cells $\mathbf{11}_{11}$~$\mathbf{11}_{XY}$ further outputs a selected pixel event signal ot11~otXY. As illustrated in FIG. 1, the selected pixel event signal ot11~otXY is outputted from the decoder 115. All the selected pixel event signals ot11~otXY of the SPAD cells $\mathbf{11}_{11}$~$\mathbf{11}_{XY}$ other than the selected SPAD cell are configured to be logical low. For example, if the SPAD cell $\mathbf{11}_{14}$ is selected as the selected SPAD cell, the selected pixel event signals other than ot14 are logical low, and only the pixel event signal oc14 and the selected pixel event signal ot14 of the selected SPAD cell $\mathbf{11}_{14}$ are identical since the address selection signals $X_{addr}$ and $Y_{addr}$ of the SPAD cell $\mathbf{11}_{14}$ are both logical high. In some embodiments, a repeated cycle is predetermined for the system. When the repeated cycle ends, another SPAD cell of the plurality of SPAD cells is assigned as the selected SPAD cell. Each of the SPAD cells may be assigned as the selected in sequence.

Figure 2:
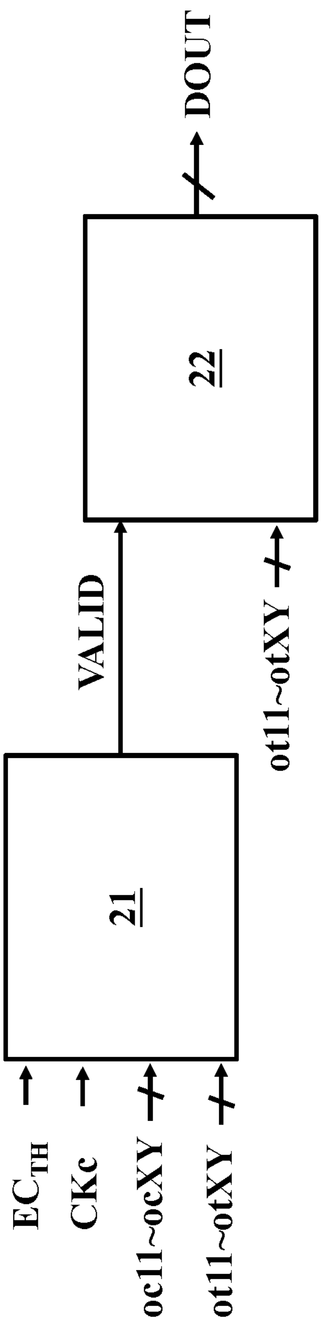
FIG. 2 is a block diagram of a periodical correlation detection (PCD) circuit and a time-to-digital converter (TDC), in accordance with some embodiments of the present disclosure.

FIG. 2 is a block diagram of a periodical correlation detection (PCD) circuit and a time-to-digital converter (TDC), in accordance with some embodiments of the present disclosure.

Each of the sensing modules 10 as illustrated in FIG. 1 further comprises a periodical correlation detection (PCD) circuit 21 as illustrated in FIG. 2 and a time-to-digital converter (TDC) 22 as illustrated in FIG. 2. In some embodiments, the selected pixel event signals ot11~otXY of the plurality of SPAD cells $\mathbf{11}_{11}$~$\mathbf{11}_{XY}$ are transmitted to both the PCD circuit 21 and the TDC 22.

The PCD circuit 21 is configured to count the pixel event signals oc11~ocXY with logical high for each detection period. The detection period is the period of a clock signal CKc. In some embodiments, the clock signal CKc is provided from a global phase locked loop unit. If the count of the pixel event signals oc11~ocXY in a detection period reaches a predetermined threshold $EC_{TH}$ and if the selected SPAD cell receives a reflected light pulse in the detection period, the PCD circuit 21 will provide a validation signal VALID. One of the selected pixel event signals ot11~otXY will be logical high if the selected SPAD cell receives a reflected light pulse in the detection period.

A time-to-digital converter (TDC) is a device for recognizing events and providing a digital representation of the time they occurred. TDCs are used to determine the time interval between two signal pulses (known as start and stop pulse). Measurement is started and stopped when the rising or falling edge of a signal pulse crosses a set threshold.

In some embodiments, when the TDC 22 receives the validation signal VALID, the TDC 22 is valid. In some embodiments, the TDC data outputs a TDC data DOUT if the TDC 22 is valid. In some embodiments, the TDC is valid if a count of the pixel event signals with logical high in one detection period reaches a predetermined threshold $EC_{TH}$ and if the selected SPAD cell receives a reflected light pulse in the detection period.

Figure 3:
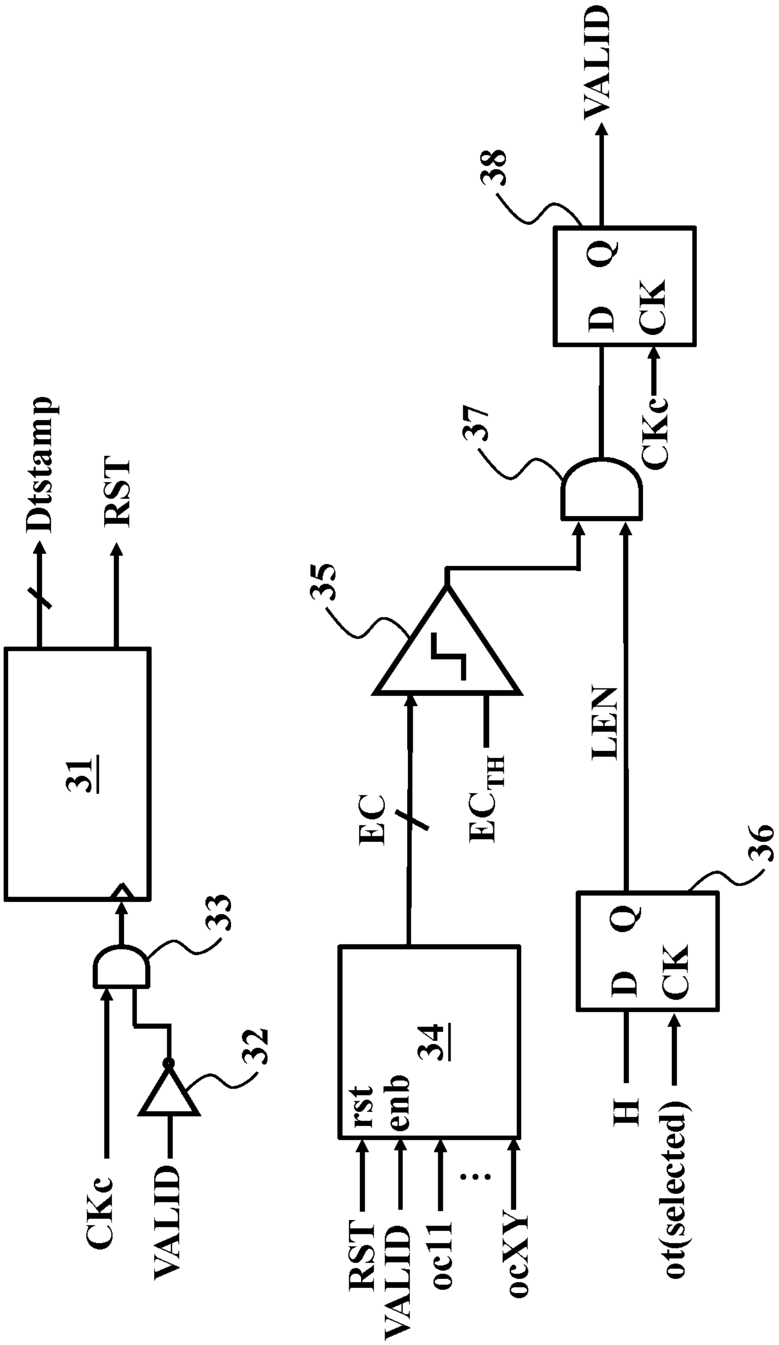
FIG. 3 is a block diagram of a PCD circuit, in accordance with some embodiments of the present disclosure.

FIG. 3 is a block diagram of a PCD circuit 21, in accordance with some embodiments of the present disclosure.

In some embodiments, the PCD circuit 21 comprises a timestamp counter 31. The timestamp counter 31 is configured to count the number of detection periods of the clock signal CKc since the timestamp counter 31 is reset. However, as shown in FIG. 3, the clock signal CKc is not directly inputted into the timestamp counter 31. The validation signal VALID is inputted into an inverter 32 to generate an inverted validation signal of the validation signal VALID, and the clock signal CKc and the inverted validation signal are inputted into AND gate 33. Therefore, the timestamp counter 31 can only count the number of detection periods of the clock signal CKc when the validation signal VALID is logical low (i.e., when the TDC is not valid). The timestamp counter 31 outputs a timestamp signal Dtstamp. In some embodiments, when the TDC is valid (i.e., the validation signal VALID is logical high), a timestamp signal of the detection period is stored. In some embodiments, the timestamp signal is reset at the beginning of each repeated cycle. In some embodiments, the timestamp counter 31 further outputs a reset signal RST. The reset signal RST is set to logical high only at the rising edge of the clock signal CKc and when the validation signal VALID is logical low (i.e., when the TDC is not valid).

In some embodiments, the PCD circuit 21 further comprises an event counter 34, a comparator 35, a D flip-flop 36, an AND gate 37 and a D flip-flop 38. The event counter 34 is configured to count the number of the pixel event signals oc11~ocXY with logical high (i.e., the reflected light pulses that the SPAD cells $\mathbf{11}_{11}$~$\mathbf{11}_{XY}$ received) between two reset signals RST. In some embodiments, the event counter 34 only counts the number of the pixel event signals oc11~ocXY when the validation signal VALID is logical low (i.e., when the TDC is not valid). In some embodiments, the PCD circuit stop counting the pixel event signals when the TDC is valid (i.e., when the validation signal VALID is logical high). The event counter 34 outputs a count EC. The count EC is inputted to the comparator 35 with a predetermined threshold $EC_{TH}$. The comparator 35 is configured to output a logical high if the count EC is equal to or greater than the predetermined threshold $EC_{TH}$. The D flip-flop 36 is triggered by the selected pixel event signal ot(selected) and outputs an enable signal LEN. The enable signal LEN is configured to be logical high only when the D flip-flop 36 is triggered by the selected pixel event signal ot(selected) (i.e., when the selected SPAD cell receives a reflected light pulse). The enable signal LEN and the output of the comparator 35 are inputted to the AND gate 37. The output of the AND gate 37 is connected to the D flip-flop 38, which is triggered by the clock signal CKc. Therefore, the validation signal VALID is set to logical high if the count of the pixel event signals oc11~ocXY in a detection period reaches a predetermined threshold $C_{TH}$ and if the selected SPAD cell receives a reflected light pulse in the detection period.

Figure 4:
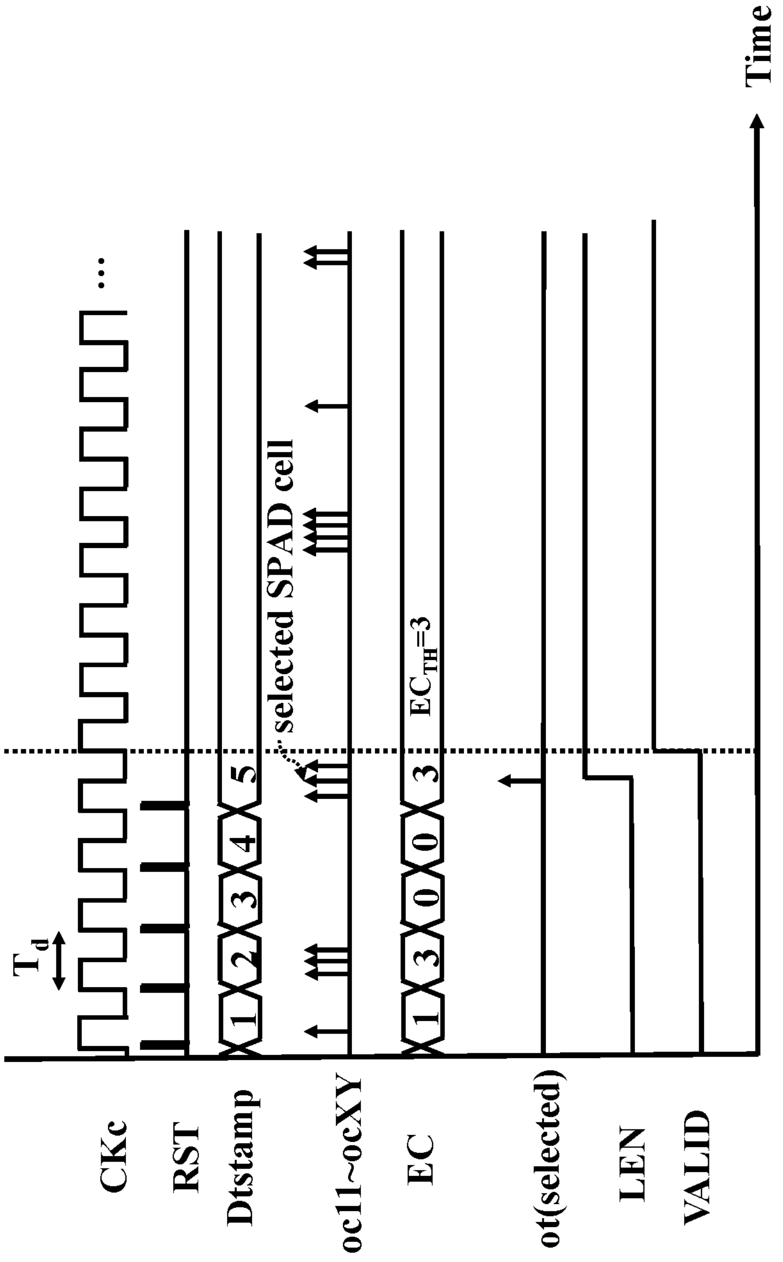
FIG. 4 is a time diagram illustrating signals in a system for time-of-flight sensing, in accordance with some embodiments of the present disclosure.

FIG. 4 is a time diagram illustrating signals in a system for time-of-flight sensing, in accordance with some embodiments of the present disclosure. Some of the signals in FIGS. 1-3 are presented in the time diagram as illustrated in FIG. 4.

In some embodiments, the clock signal CKc is provided by a global PLL unit and is in the form of square waves. The period of the clock signal CKc is the detection period $T_d$ for the system. The reset signal RST is set to logical high only at the rising edge of the clock signal CKc and when the validation signal VALID is logical low (i.e., when the TDC is not valid). The timestamp signal Dtstamp is the count of the number of detection periods of the clock signal CKc since the timestamp counter 31 is reset. When the validation signal VALID becomes logical high, the timestamp counter 31 stop counting so that the timestamp signal Dtstamp remains the same. The pixel event signals oc11~ocXY are also shown in the time diagram and are in the form of impulses.

The event counter 34 only counts the number of the pixel event signals oc11~ocXY for each detection period Td and output the count EC. As illustrated in FIG. 4, the pixel event signals oc11~ocXY have only one impulse in the first detection period, three impulses in the second detection period, zero impulse in the third and fourth detection periods and three impulses in the fifth detection period. One of the three impulses in the fifth detection period is from the selected SPAD cell. Therefore, the counts EC of the first to the fifth detection periods are "1", "3", "0", "0" and "3". Since the predetermined threshold $EC_{TH}$ in this case is "3", the comparator 35 of FIG. 3 outputs logical high. Moreover, since the selected pixel event signal ot(selected) also has an impulse in the fifth detection period (i.e., the selected SPAD cell receives a reflected light pulse in the fifth period), the enable signal LEN becomes logical high. Since both the output of the comparator 35 and the enable signal LEN are logical high, the validation signal VALID becomes logical high at the next rising edge of the clock signal CKc.

Figure 5:
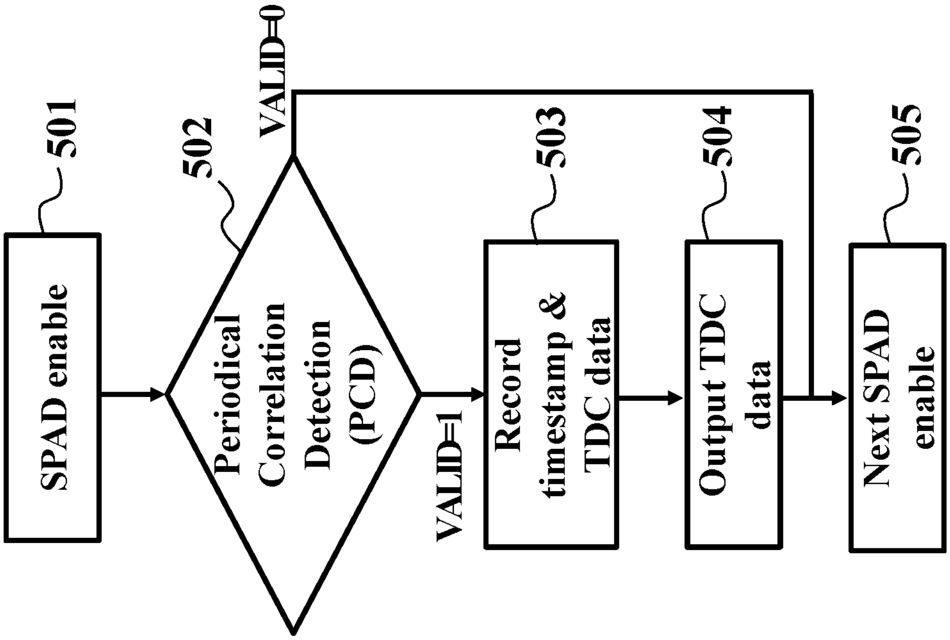
FIG. 5 is a flowchart of a method for time-of-flight sensing, in accordance with some embodiments of the present disclosure.

FIG. 5 is a flowchart of a method for time-of-flight sensing, in accordance with some embodiments of the present disclosure.

In step 501, one of the SPAD cells $\mathbf{11}_{11}$~$\mathbf{11}_{XY}$ are selected. In step 502, the PCD circuit 21 perform the periodical correlation detection. If the validation signal VALID becomes logical high, step 503 is then performed to record the timestamp signal Dtstamp of the detection period and the TDC data DOUT, and then, in step 504, the TDC data DOUT is outputted. Finally, in step 505, the next SPAD cell is selected. If the validation signal VALID becomes logical low, step 505 is directly jumped to and the next SPAD cell is selected.

The present disclosure relates to an improved coincidence detection method. In an ordinary coincidence detection method, if a time window starts from a pixel event from a selected SPAD cell, the ordinary coincidence detection method loses the coincident photons before the pixel event from the selected SPAD cell since the pixel event from the selected SPAD cell may not be the first pixel event of all the SPAD cells. Therefore, the ordinary coincidence detection method is suitable for applications with macro pixels, but the applications with macro pixels usually provides a poor spatial resolution. However, the present disclosure detects the coincident photons both before and after the pixel event of the selected SPAD cell within a given time window. Therefore, all coincident events can be detected, thereby a better spatial resolution can be achieved.

Figure 6:
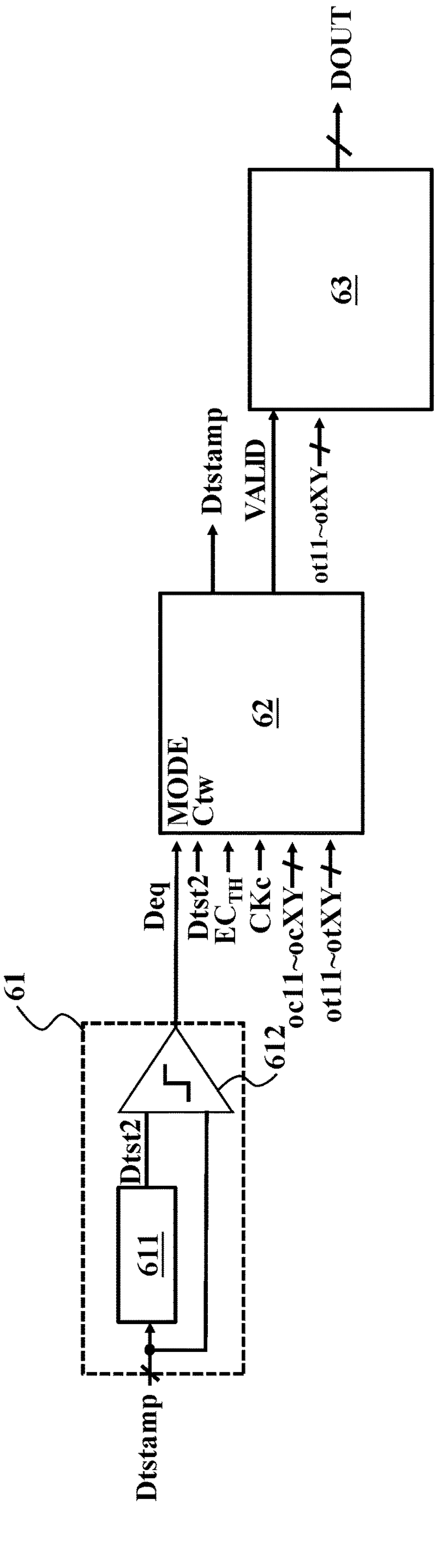
FIG. 6 is a block diagram of a PCD circuit, a timestamp data comparator and a TDC, in accordance with some embodiments of the present disclosure.

FIG. 6 is a block diagram of a PCD circuit, a timestamp data comparator and a TDC, in accordance with some embodiments of the present disclosure.

Each of the sensing modules 10 as illustrated in FIG. 1 further comprises a timestamp data comparator 61 as illustrated in FIG. 6, a periodical correlation detection (PCD) circuit 62 as illustrated in FIG. 6 and a time-to-digital converter (TDC) 63 as illustrated in FIG. 6. In some embodiments, the selected pixel event signals ot11~otXY of the plurality of SPAD cells $\mathbf{11}_{11}$~$\mathbf{11}_{XY}$ are transmitted to both the PCD circuit 62 and the TDC 63.

The PCD circuit 62 is configured to count the pixel event signals oc11~ocXY for each detection period. The detection period is the period of a clock signal CKc. In some embodiments, the clock signal CKc is provided from a global phase locked loop unit. If the count of the pixel event signals oc11~ocXY in a detection period reaches a predetermined threshold $EC_{TH}$ and if the selected SPAD cell receives a reflected light pulse with logical high in the detection period, the PCD circuit 62 will provide a validation signal VALID. One of the selected pixel event signals ot11~otXY will be logical high if the selected SPAD cell receives a reflected light pulse in the detection period.

In some embodiments, when the TDC 63 receives the validation signal VALID, the TDC 63 is valid. In some embodiments, the TDC data outputs a TDC data DOUT if the TDC 63 is valid.

The difference between FIG. 2 and FIG. 6 lies in that there is a timestamp data comparator 61 in FIG. 6. The timestamp data comparator 61 is configured to store and compare timestamp signals Dtstamp of two continuous detection periods, and, according to the comparison, the PCD circuit 62 is switched between two operating modes. In some embodiments, the timestamp data comparator 61 comprises a memory 611 and a comparator 612. As shown in FIG. 6, the memory 611 is configured to store the timestamp signal Dtstamp as a former timestamp signal Dtst2, and the comparator 612 is configured to compare the former timestamp signal Dtst2 with the timestamp signal Dtstamp of the next detection period. If the timestamp signal Dtstamp of the next detection period is identical to the former timestamp signal Dtst2, the comparator 612 outputs an equality signal Deq as logical high. The equality signal Deq is used as a mode signal MODE for the PCD circuit 62. In some embodiments, the system operates in a first operating mode if the mode signal MODE is logical low, and the system operates in a second operating mode if the mode signal MODE is logical high. The former timestamp signal Dtst2 is also inputted into the PCD circuit 62. The former timestamp signal Dtst2 is used as a fixed timestamp signal Ctw for the PCD circuit 62. In some embodiments, the PCD circuit 62 operates in either a first operating mode or a second operating mode based on an output Deq of the timestamp data comparator 61.

In some embodiments, the first operating mode is an improved coincidence detection mode which detects the coincident events before and after the selected SPAD cell is triggered within a given time window (i.e., detection period), and the second operating mode is a time-gating mode. The first operating mode helps the system to detect a rough target distance so that, when the system is switched to the second operating mode (i.e., the time-gating mode), the system can count the pixel event signals oc11~ocXY in a given time gate/window.

Figure 7:
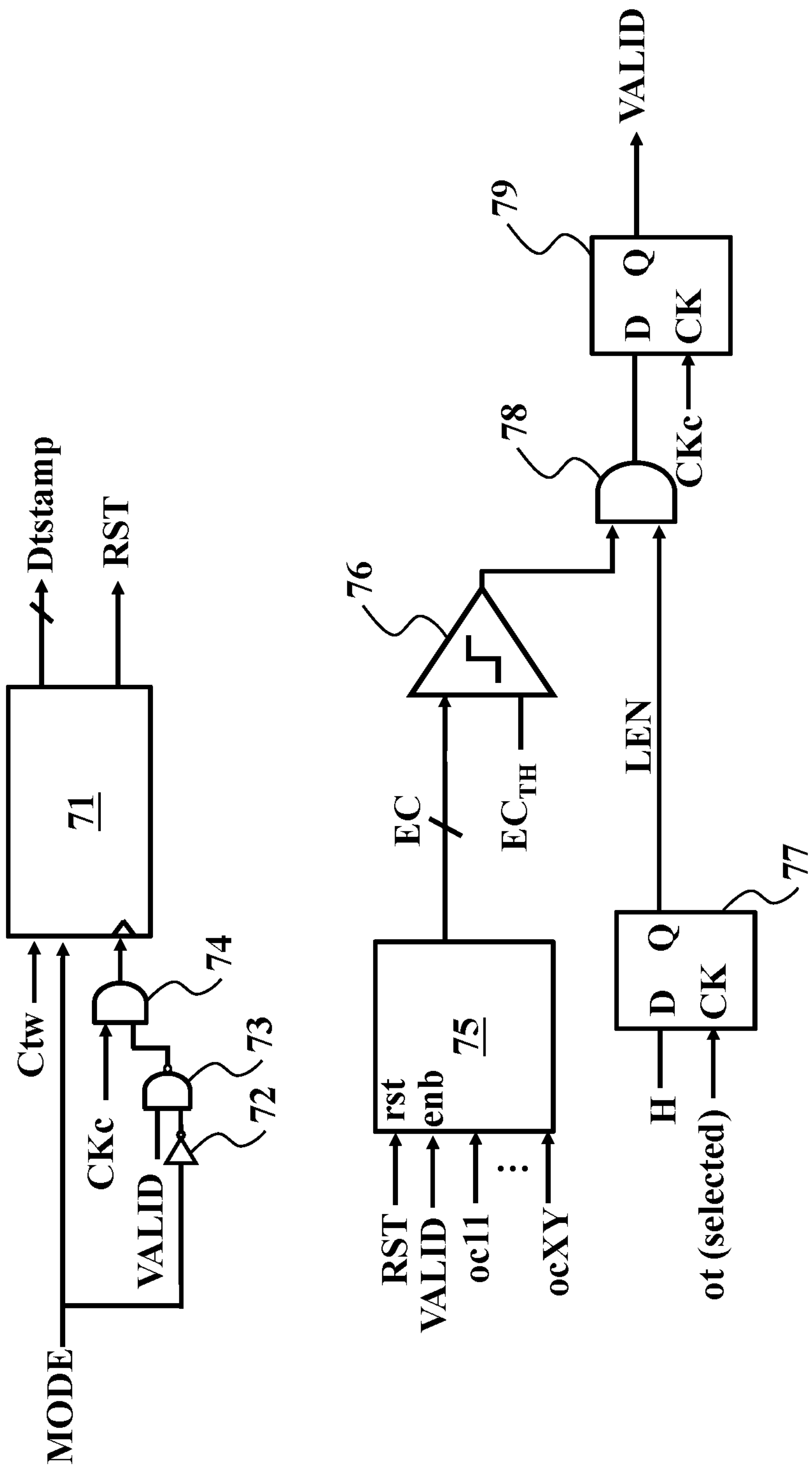
FIG. 7 is a block diagram of a PCD circuit, in accordance with some embodiments of the present disclosure.

FIG. 7 is a block diagram of a PCD circuit 62, in accordance with some embodiments of the present disclosure.

In some embodiments, the PCD circuit 62 comprises a timestamp counter 71. The timestamp counter 71 is configured to count the number of detection periods of the clock signal CKc since the timestamp counter 71 is reset. However, as shown in FIG. 7, the clock signal CKc is not directly inputted into the timestamp counter 71. The mode signal MODE is inputted into an inverter 72. The inverted mode signal and the validation signal VALID are inputted into a NAND gate 73, and the clock signal CKc and the output of the NAND gate 73 are inputted into AND gate 74. Therefore, the timestamp counter 31 can only count the number of detection periods of the clock signal CKc when the validation signal VALID is logical low (i.e., when the TDC is not valid) and the mode signal MODE is logical low (i.e., the system is operated in the first operating mode), or when the validation signal VALID is logical high (i.e., when the TDC is valid) and the mode signal MODE is logical high (i.e., the system is operated in the second operating mode). The timestamp counter 31 outputs a timestamp signal Dtstamp. In some embodiments, when the TDC is valid (i.e., the validation signal VALID is logical high), a timestamp signal of the detection period is stored. In some embodiments, the timestamp signal is reset at the beginning of each repeated cycle. In some embodiments, the mode signal MODE and the fixed timestamp signal Ctw are also inputted into the timestamp counter 71. In some embodiments, the timestamp counter 71 further outputs a reset signal RST. In the first operating mode, the reset signal RST is set to logical high only at the rising edge of the clock signal CKc and when the validation signal VALID is logical low (i.e., when the TDC is not valid). In the second operating mode, the reset signal RST is set to logical low only when the fixed timestamp signal Ctw is identical to the timestamp signal Dtstamp.

In some embodiments, the PCD circuit 21 further comprises an event counter 75, a comparator 76, a D flip-flop 77, an AND gate 78 and a D flip-flop 79. The event counter 75 is configured to count the number of the pixel event signals oc11~ocXY with logical high (i.e., the reflected light pulses that the SPAD cells $\mathbf{11}_{11}$~$\mathbf{11}_{XY}$ received) between two reset signals RST. In some embodiments, the event counter 75 only counts the number of the pixel event signals oc11~ocXY when the validation signal VALID is logical low (i.e., when the TDC is not valid). In some embodiments, the PCD circuit 62 stop counting the pixel event signals when the TDC is valid (i.e., when the validation signal VALID is logical high). The event counter 34 outputs a count EC. The count EC is inputted to the comparator 76 with a predetermined threshold $EC_{TH}$. The comparator 76 is configured to output a logical high if the count EC is equal to or greater than the predetermined threshold $EC_{TH}$. The D flip-flop 77 is triggered by the selected pixel event signal ot(selected) and outputs an enable signal LEN. The enable signal LEN is configured to be logical high only when the D flip-flop 77 is triggered by the selected pixel event signal ot(selected) (i.e., when the selected SPAD cell receives a reflected light pulse). The enable signal LEN and the output of the comparator 76 are inputted to the AND gate 78. The output of the AND gate 78 is connected to the D flip-flop 79, which is triggered by the clock signal CKc. Therefore, the validation signal VALID is set to logical high if the count of the pixel event signals oc11~ocXY in a detection period reaches a predetermined threshold $EC_{TH}$ and if the selected SPAD cell receives a reflected light pulse in the detection period.

Figure 8:
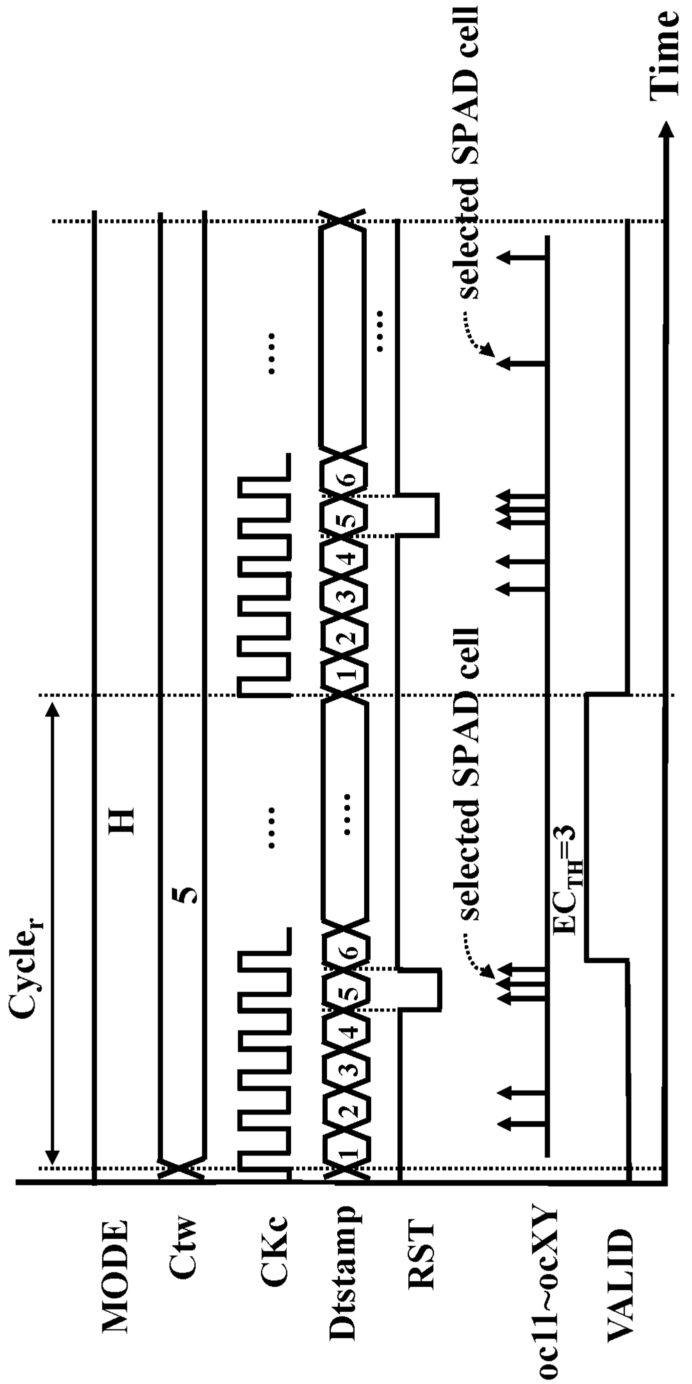
FIG. 8 is a time diagram illustrating signals in a system for time-of-flight sensing, in accordance with some embodiments of the present disclosure.

FIG. 8 is a time diagram illustrating signals in a system for time-of-flight sensing, in accordance with some embodiments of the present disclosure.

The time diagram of the signals of the system in the first operating mode is similar to the time diagram shown in FIG. 4. FIG. 8 further illustrates the signals in the second operating mode. The mode signal MODE is logical high so that the system is in the second operating mode. The fixed timestamp signal Ctw is "5", which means that the system detects two continuous ToF measurements both when the timestamp signal Dtstamp is "5." The clock signal CKc is provided by a global PLL unit and is in the form of square waves. The timestamp signal Dtstamp increments for each detection period in the second operating mode. The timestamp signal Dtstamp is reset at the beginning of each repeated cycle $Cycle_r$. As illustrated in FIG. 8, in the fifth detection period, the timestamp signal Dtstamp is "5" so that the timestamp counter 71 detects that the timestamp signal Dtstamp is identical to the fixed timestamp signal Ctw so that the reset signal RST is set to logical low. When the reset signal RST is logical low, the event counter 75 counts the number of the pixel event signals oc11~ocXY. As shown in FIG. 8, there are three impulses in the fifth detection period, and one of the three impulses is from the selected SPAD cell. Since the predetermined threshold $EC_{TH}$ is "3," the validation signal VALID is set to logical high at the next rising edge of the clock signal CKc. The validation signal VALID is also reset at the beginning of each repeated cycle $Cycle_r$. However, in the fifth detection period of the second repeated cycle $Cycle_r$, although there are three impulses in the fifth detection period, the selected SPAD cell does not provide any impulse. Therefore, the validation signal VALID remains logical low.

Figure 9:
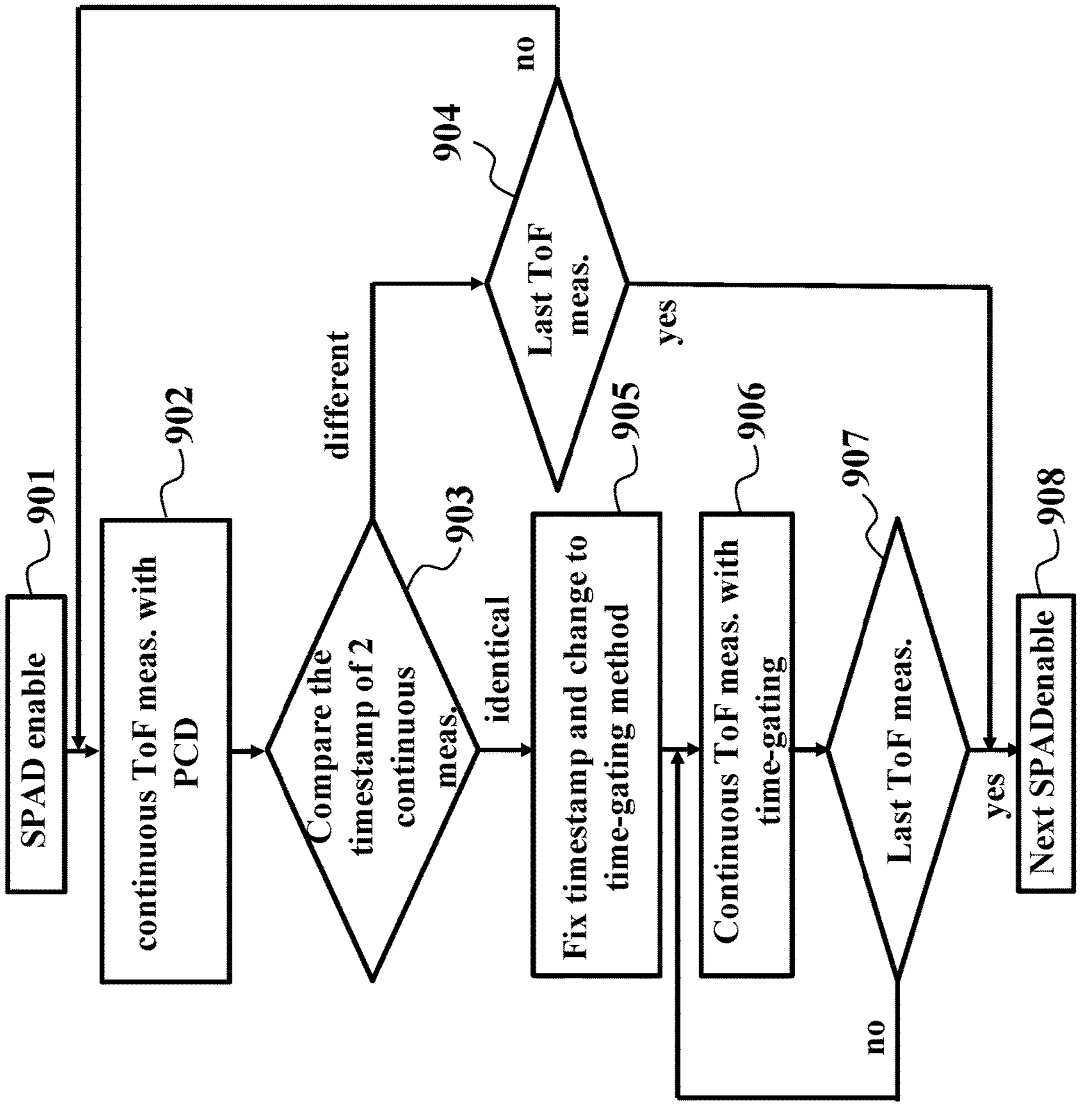
FIG. 9 is a flowchart of a method for time-of-flight sensing, in accordance with some embodiments of the present disclosure.

FIG. 9 is a flowchart of a method for time-of-flight sensing, in accordance with some embodiments of the present disclosure.

In step 901, one of the SPAD cells $\mathbf{11}_{11}$~$\mathbf{11}_{XY}$ are selected. In step 902, the PCD circuit 62 perform the periodical correlation detection in the first operating mode as in FIG. 5. In step 903, the timestamp data comparator 61 compares two continuous measurements. If the timestamp signals Dtstamp are identical, in step 905, the timestamp signals Dtstamp is stored as the fixed timestamp signal Ctw and the system is switched to the second operating mode. The system then perform ToF measurements as shown in the time diagram of FIG. 8 in step 906. The system continuously measures and check whether the last ToF measurement is reached in step 907. However, in step 903, if the timestamp signals Dtstamp are different, the system also check whether the last ToF measurement is reached in step 904. If the last ToF measurement is reached, the next SPAD cell is selected in step 908.

The present disclosure provides a system and a method for time-of-flight (TOF) sensing that can detect all coincident events and improve the TDC validation rate. The present disclosure can be applied to any systems with full array 3D depth map without scarify resolution. Moreover, the system can switch to a time-gating mode (i.e., the second operating mode) as long as the distance of the target object in a scene is approximately known by detecting two continuous measurements in the same timestamp. The system operating in the time-gating 1*o* method will consume less power since the system will only detect the pixel events at a time window with a fixed timestamp. The signal-to-noise-and-background ratio can also be maximized to levels that guarantee the required depth accuracy for the system. By operating in two different operating modes (i.e., the improved coincidence detection mode and the time gating mode), the present disclosure provide a solution that can sense time-of-flight efficiently according to the circumstances that the system is under.

In some embodiments, a system for ToF sensing comprises a sensing module array comprising a plurality of sensing modules. Each of the sensing modules comprises: a plurality of single-photon avalanche diode (SPAD) cells, a periodical correlation detection (PCD) circuit and a time-to-digital converter (TDC). The plurality of SPAD cells is for receiving reflected light pulses. Each of the SPAD cells outputs a pixel event signal with logical high if the SPAD cell receives a reflected light pulse. One of the SPAD cells is a selected SPAD cell. The PCD circuit is configured to count the pixel event signals with logical high for each detection period. The TDC is valid if a count of the pixel event signals with logical high in one detection period reaches a predetermined threshold and if the selected SPAD cell receives a reflected light pulse in the detection period.

In some embodiments, a system for ToF sensing comprises a sensing module array. The sensing module array comprises a plurality of sensing modules. Each of the sensing modules comprises a plurality of single-photon avalanche diode (SPAD) cells, a periodical correlation detection (PCD) circuit, a timestamp data comparator and a time-to-digital converter (TDC). The plurality of SPAD cells is for receiving reflected light pulses. Each of the SPAD cells outputs a pixel event signal with logical high if the SPAD cell receives a reflected light pulse. One of the SPAD cells is a selected SPAD cell. The PCD circuit counts the pixel event signals with logical high for each detection period. The PCD circuit further comprises a timestamp counter for outputting a timestamp signal. The timestamp signal is reset at the beginning of each repeated cycle. The timestamp data comparator is configured to store and compare timestamp signals. The PCD circuit operates in either a first operating mode or a second operating mode based on an output of the timestamp data comparator. The TDC is configured to output TDC data when the TDC is valid.

In some embodiments, a method for ToF sensing comprises: selecting a single-photon avalanche diode (SPAD) cell of a plurality of SPAD cells for receiving reflected light pulses; counting the number of the SPAD cells of the plurality of SPAD cells that receive the reflected light pulses for a detection period; determining whether the number of the SPAD cells that receive the reflected light pulses reach a predetermined threshold in the detection period; determining whether the selected SPAD cell receives the reflected light pulses in the detection period; and if the number of the SPAD cells that receive the reflected light pulses in the detection period reach a predetermined threshold and if the selected SPAD cell receives the reflected light pulses in the detection period, recording a timestamp of the detection period and outputting time-to-digital converter (TDC) data.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for time-of-flight (TOF) sensing, comprising:
- a sensing module array comprising a plurality of sensing modules, each of the sensing modules comprising:
  - a plurality of single-photon avalanche diode (SPAD) cells for receiving reflected light pulses, wherein each of the SPAD cells outputs a pixel event signal with logical high if the SPAD cell receives a reflected light pulse, and wherein one of the SPAD cells is a selected SPAD cell;
  - a periodical correlation detection (PCD) circuit configured to count the pixel event signals with logical high for each detection period, the PCD circuit comprising:
    - a timestamp counter for outputting a timestamp signal, the timestamp signal being reset at the beginning of each repeated cycle; and
    - a timestamp data comparator configured to store and compare timestamp signals;
  - and
  - a time-to-digital converter (TDC), wherein the TDC is configured to output TDC data when the TDC is determined to be valid in response to both of the following conditions being satisfied:
  - (i) a count of the pixel event signals with logical high in one detection period reaching a predetermined threshold, and
  - (ii) the selected SPAD cell receiving a reflected light pulse in the detection period,
  - wherein the PCD circuit is configured to operate in either a first operating mode or a second operating mode based on an output of the timestamp data comparator; and
  - wherein in the first operating mode:
    - in response to the TDC being determined to be valid in a first detection period during a first repeated cycle, the timestamp data comparator stores a first timestamp signal of the first detection period;
    - in response to the TDC being determined to be valid in a second detection period during a second repeated cycle following the first repeated cycle, the timestamp data comparator compares the first timestamp signal with a second timestamp signal of the second detection period; and
    - if the first timestamp signal is identical to the second timestamp signal, the first timestamp signal is set as a fixed timestamp signal, and the PCD circuit switches to the second operating mode.

2. The system of claim 1, wherein when the TDC is valid, a timestamp signal of the detection period is stored.

3. The system of claim 1, wherein when a repeated cycle ends, another SPAD cell of the plurality of SPAD cells is assigned as the selected SPAD cell.

4. The system of claim 1, wherein the TDC data outputs a TDC data if the TDC is valid.

5. The system of claim 1, wherein the PCD circuit stops counting the pixel event signals when the TDC is valid.

6. The system of claim 1, wherein each of the plurality of the SPAD cells further outputs a selected pixel event signal, and wherein the selected pixel event signal of the selected SPAD cell is configured to be logical high when the pixel event signal of the selected SPAD cell is logical high, and wherein each of the SPAD cells includes a decoder for generating the selected pixel event signal based on address selection signals.

7. The system of claim 6, wherein the TDC is valid if a count of the pixel event signals with logical high in one detection period reaches a predetermined threshold and if the selected pixel event signal of the selected SPAD cell is detected in the detection period.

8. The system of claim 7, wherein the selected pixel event signals of the plurality of SPAD cells are transmitted to both the PCD circuit and the TDC.

9. The system of claim 1, wherein the plurality of SPAD cells are arranged in x rows and y columns in each of the sensing modules.

10. The system of claim 1, wherein, in the first operating mode:
- the timestamp signal increments for each detection period until the TDC being valid.

11. The system of claim 1, wherein, in the second operating mode:
- the timestamp signal increments for each detection period, and
- the TDC is determined to be valid in response to the count of the pixel event signals in a detection period reaching a predetermined threshold, the selected SPAD cell receiving a reflected light pulse in the detection period and a timestamp signal of the detection period being identical to the fixed timestamp signal.

12. The system of claim 1, wherein the plurality of SPAD cells are arranged in x rows and y columns, and wherein after a last time-of-flight is measured, another SPAD cell of the plurality of SPAD cells is assigned as the selected SPAD cell.

13. The system of claim 1, wherein the PCD circuit stops counting the pixel event signals when the TDC is valid.

14. The system of claim 1, wherein each of the plurality of the SPAD cells further outputs a selected pixel event signal, and the selected pixel event signal of the selected SPAD cell is configured to be logical high when the pixel event signal of the selected SPAD cell is logical high, and wherein each of the SPAD cells includes a decoder for generating the selected pixel event signal based on address selection signals.

15. A method for time-of-flight sensing, the method comprising:

selecting a single-photon avalanche diode (SPAD) cell of a plurality of SPAD cells for receiving reflected light pulses;

counting the number of the SPAD cells of the plurality of SPAD cells that receive the reflected light pulses for a detection period;

determining whether the number of the SPAD cells that receive the reflected light pulses reach a predetermined threshold in the detection period;

determining whether the selected SPAD cell receives the reflected light pulses in the detection period;

recording a timestamp of the detection period and outputting time-to-digital converter (TDC) data in response to both of the following conditions being satisfied:

(i) the number of the SPAD cells that receive the reflected light pulses in the detection period reaching a predetermined threshold, and (ii) the selected SPAD cell receiving the reflected light pulses in the detection period;

determining whether the recorded timestamp of a current cycle is identical to the recorded timestamp of a previous cycle; and in response to the recorded timestamp of the current cycle being determined to be identical to the recorded timestamp, storing the recorded timestamp of the current cycle as a fixed timestamp and switching to a time-gating mode.

16. The method of claim 15, further comprising:

in response to the recorded timestamp of the current cycle being not identical to the recorded timestamp of the previous cycle, determining whether a last time-of-flight condition is reached.

17. The method of claim 16, wherein the time-gating mode comprises a fixed timestamp mode which comprises:

determining whether a timestamp of the detection period is identical to the fixed timestamp;

in response to the timestamp of the detection period being identical to the fixed time stamp, determining whether the number of the SPAD cells that receive the reflected light pulses in a detection period reach a predetermined threshold and determining whether the selected SPAD cell receives the reflected light pulses in the detection period;

in response to the number of the SPAD cells that receive the reflected light pulses reaching a predetermined threshold and the selected SPAD cell receiving the reflected light pulses, outputting the TDC data;

determining whether a last time-of-flight condition is reached; and in response to the last time-of-flight condition being determined being reached, switch to the first operating mode.

* * * * *